No. 764,455. PATENTED JULY 5, 1904.
L. P. GRAHAM.
CORN PLANTER.
APPLICATION FILED NOV. 7, 1903.
NO MODEL. 2 SHEETS—SHEET 1.
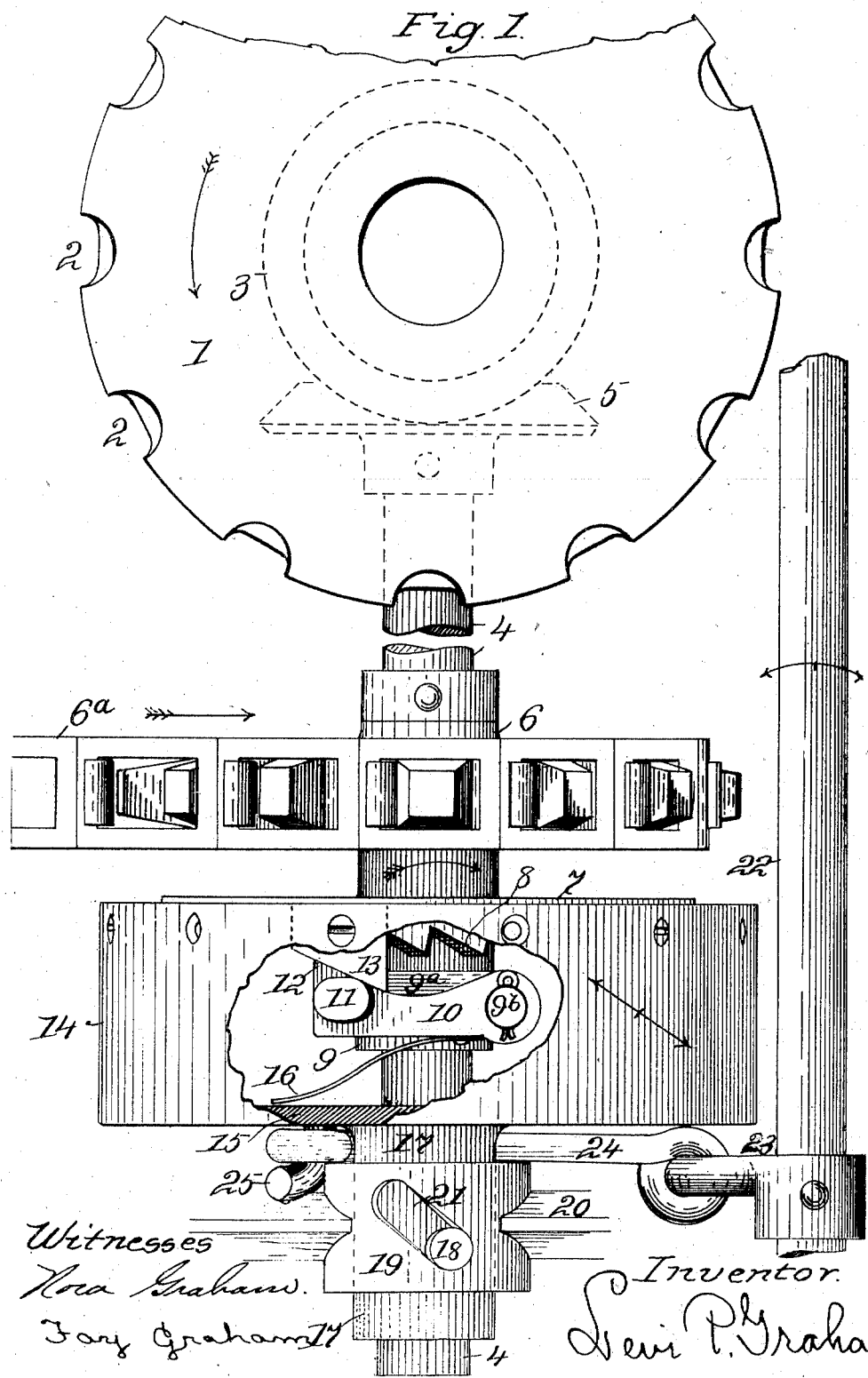

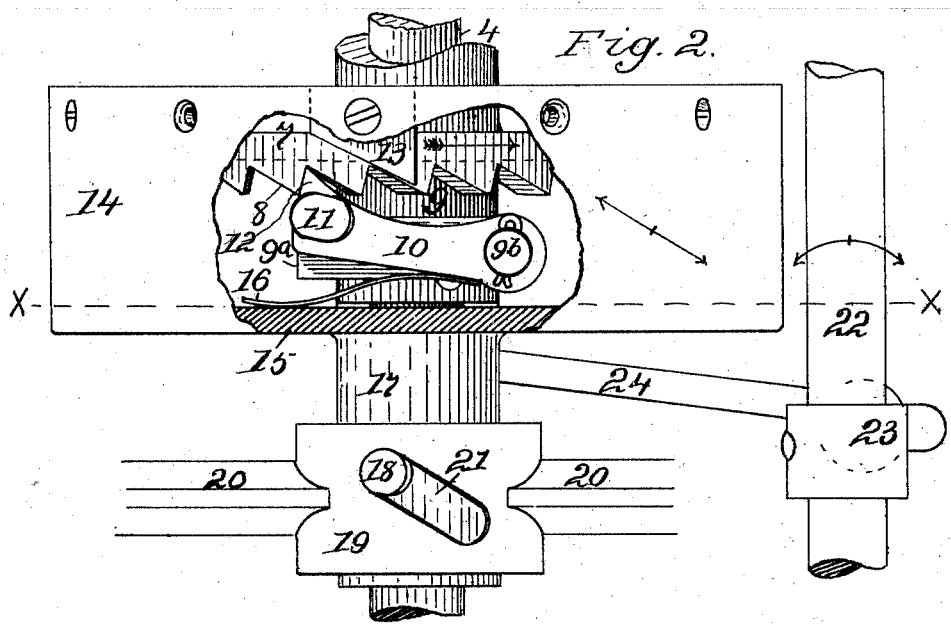
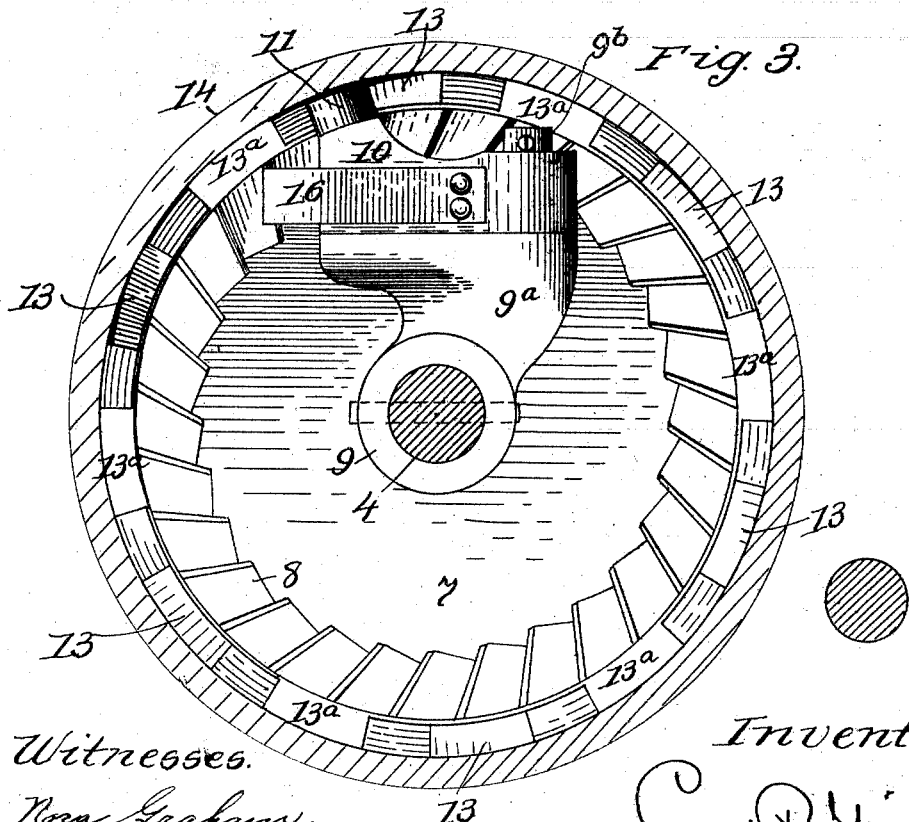

No. 764,455.

Patented July 5, 1904.

UNITED STATES PATENT OFFICE.

LEVI P. GRAHAM, OF DECATUR, ILLINOIS.

CORN-PLANTER.

SPECIFICATION forming part of Letters Patent No. 764,455, dated July 5, 1904.

Application filed November 7, 1903. Serial No. 180,281. (No model.)

*To all whom it may concern:*

Be it known that I, LEVI P. GRAHAM, of the city of Decatur, county of Macon, and State of Illinois, have invented certain new and useful Improvements in Corn-Planters, of which the following is a specification.

This invention relates to planters in which the seed-plates have each a plurality of cells adapted to each contain a single grain of corn and in which the seed-plates are started at cross-rows and stopped after a hill has been drilled from each plate to the second drop. In this class of planters a clutch or its equivalent is used to get the start-and-stop motion of the seed-plates, and heretofore the plates have been given the same motion, usually a quarter-rotation, at each dropping operation. This has necessitated the use of different seed-plates to drop different numbers of grains in a hill, and it is the principal object of this invention to provide a clutch which may be used to drive the seed-plates different distances, so that either two grains, three grains, or four grains may be dropped repeatedly from a single seed-plate.

A secondary object of this invention is to provide for forcing the clutch in mesh and out of mesh by positive mechanical action instead of depending upon a spring to carry the shiftable member in one direction, and still another object is to so construct the clutch that the operative parts will be inclosed.

In the drawings forming part of this specification, Figure 1 is a plan of so much of a planter as is needed to explain this invention, the throw-out ring being broken away to expose the clutch mechanism therein and the clutch members being shown disconnected or out of mesh. Fig. 2 is a plan of the clutch, showing the clutch members connected or in mesh. Fig. 3 is a section on line X in Fig. 2.

The seed-plate 1 has cells, as 2, and these are preferably formed in the perimeter of the plate, as shown, although that is a matter foreign to this invention. The seed-plate has twelve cells, each adapted to hold a single grain of corn and at approximately equal distances apart. The seed-plate is driven by a shaft 4, commonly called a "drill-shaft." The means employed for transmitting motion from the drill-shaft to the seed-plate preferably comprises the gear-wheels 3 and 5, (shown in broken lines in Fig. 1,) and the speed of rotation of the plate is the same as that of the shaft.

A sprocket-wheel 6 is journaled loosely on the drill-shaft, and it is driven from the travel of the planter through a chain $6^a$ in the customary manner. A ratchet-wheel 7 is connected to or formed integral with the sprocket-wheel, and it has laterally-projecting teeth, as 8. A collar 9 is fastened to the drill-shaft opposite the toothed face of the ratchet-wheel. An arm $9^a$ projects away from the collar 9, and a pin $9^b$ on the extended end of the arm provides a pivot for pawl 10. The pawl is adapted to engage the teeth of the ratchet-wheel. It has a spring 16, through which it may be forced yieldingly into contact with the ratchet-teeth, and it has a stud 11, which projects beyond the perimeter of the ratchet-wheel and provides a bearing through which the pawl may be forced out of contact with the ratchet-teeth. The tooth-engaging end of the pawl is shown at 12.

A collar 17 is mounted loosely on the drill-shaft opposite the toothed face of the ratchet-wheel and beyond collar 9. A disk 15 is formed on the end of the collar 17, adjoining collar 9, and a ring 14 projects from the perimeter of the disk around the ratchet-wheel and the pawl. The inner diameter of ring 14 is enough larger than the external diameter of the ratchet-wheel to permit the insertion of throw-out cams, as 13, between the ring and the ratchet-wheel. There are as many spaces for throw-out cams as there are cells in the seed-plate. In this instance one-half of the spaces are occupied by cams, as shown in Fig. 3, and the vacant spaces are designated by $13^a$.

The collar or hub 17 is movable lengthwise on the drill-shaft. It carries the disk, the ring, and the cams, and its position determines whether the pawl shall be forced into engagement with the ratchet-wheel through action of the disk on spring 16 or shall be forced out of engagement by action of the cams against stud 11. When the hub 17 is at its nearest approach to the ratchet-wheel, as shown in Fig. 2, the disk 15 bears against spring 16 and forces the pawl against the teeth of the ratchet-wheel, the cams being meanwhile carried out of the path of stud 11. When the disk is farthest from the ratchet-wheel, as shown in Fig. 1, the cams are in the path of the stud of the pawl, where one of them will compel separation of the pawl from the ratchet-wheel at a proper time, and the disk is in position to permit the pawl to swing away from the ratchet-wheel. While the pawl is engaged with the ratchet-wheel, the seed-plate turns with the drill-shaft, and when the stud 11 reaches a cam 13 the pawl is separated from the ratchet-wheel by inclined-plane action, and the motion of the seed-plate ceases for the time being.

The motion of the disk and ring toward and from the ratchet-wheel is the essential movement; but in this instance the hub 17 is also given an oscillating motion, somewhat as indicated by the arrows on the ring in Figs. 1 and 2. This compound or oblique motion of the hub and its adjuncts is largely a matter of mechanical economy or simplification of structure, as the clutch is thrown in mesh through motion received from a rocking check-row shaft 22. The check-row shaft extends parallel with the drill-shaft, and the oblique motion is imparted somewhat more directly than a simple reciprocating motion lengthwise of the shaft could be. It is, however, preferable to give the cams the oblique movement shown herein, for the reason that the shift from the position shown in Fig. 1 to that shown in Fig. 2 and back again is made with considerable rapidity, and if the cam holding the pawl out of mesh with the ratchet-wheel is moved back of the stud in forcing the pawl into engagement with the ratchet-wheel and then carried forward on its return movement it is not so likely to strike the stud a detaching blow in case the ratchet-wheel shall not have carried the pawl entirely out of the way. The pawl is moved forward by the ratchet-wheel as soon as an engagement is made; but at times the nose of tooth 12 of the pawl will strike the nose of a tooth of the ratchet-wheel. Engagement of the pawl will thus be slightly delayed, and in the meantime the cams are making their oscillation at a rate of speed greater than the ratchet-wheel is traveling.

To get the oblique movement in hub 17, the disk 15, and the ring 14, an oblique relatively stationary bearing must be made to engage either the hub or the ring. In this instance a collar 19 is made to encompass the hub more or less completely, is held stationary with relation to the shaft and the hub by means of arms 20, which connect with some part of the planter-frame, (not shown,) and is provided with an oblique slot 21, through which a pin 18 extends from the hub.

The check-row shaft 22 has an arm 23, and a rod 24 connects the swinging end of the arm with a hooked pin 25 on the exterior surface of disk 15. The check-row shaft is rocked backward and forward at cross-rows in the customary manner and by any desirable means, and the backward movement forces the pawl into engagement with the ratchet-wheel, while the complementary forward movement carries the cams into position to separate the pawl from the ratchet-wheel when a seed-dropping operation is completed.

The spring 16 will yield in case of a clash between the nose of the pawl and the nose of a ratchet-tooth, thus permitting the check-row shaft to complete its seed-dropping motion, and as soon as the travel of the ratchet-wheel permits completion of the engagement the spring will force the pawl to place.

When it is desired to plant two grains in a hill, six cams are used and placed one in each alternate cam-space, as shown in the drawings. When it is desired to plant three grains in a hill, four cams are used and are placed so that there will be two cam-spaces between each two adjacent cams. When it is desired to plant four grains in a hill, three cams are used and are placed equal distances apart. In other words, the cams are made to divide the cam-ring into sixths when it is desired to plant twos, into fourths when it is desired to plant threes, and into thirds when four grains in a hill is desired. The reason for this division is that the seed-plate has twelve cells. The ratchet-wheel travels at the same speed as the seed-plate, and to subdivide the ratchet-wheel is to subdivide the seed-plate. Twelve divided by six equals two, twelve divided by four equals three, and twelve divided by three equals four, twelve being a multiple of two, of three, and of four. In this instance screws are used to hold the cams in place; but these are merely representative of the various mechanical appliances for detachably or adjustably connecting the cams with the ring, and it is obvious that two or more cams may be connected together to form a set.

The drill-shaft is driven at a speed sufficient to complete about a one-half rotation between cross-rows in case its motion should be continued; but only a part of this motion is used. In planting fours the drill-shaft makes a one-third rotation at each operation. In planting threes a one-fourth rotation is used, and in planting twos the drill-shaft and seed-plate move but one-sixth of a rotation between stops.

The cams are inclined planes on their operative surfaces, and they force the pawl unyieldingly out of engagement with the ratchet-wheel when they are protruded into the path of stud 11. After the pawl is forced out of engagement with the ratchet-wheel it is free to move entirely out of touch with the teeth, and there is no spring-pressure tending to develop clicking of the pawl against the ratchet-teeth. The spring 16 is merely a yielding extension of the pawl, through which the pawl is forced into engagement with the ratchet-wheel when the disk is moved toward the wheel, and ordinarily the spring is passive or inactive.

The disk, the ring, and the outer face of the ratchet-wheel incase and protect the ratchet-teeth and the pawl.

I claim—

1. In a planter, the combination of a seed-plate having a plurality of single-grain cells, a ratchet-wheel driven by the travel of the planter, a pawl adapted to engage the ratchet-wheel and transmit motion therefrom to the seed-plate, and a plurality of throw-out cams protrudable into the path of travel of the pawl at different points.

2. In a planter, the combination of a seed-plate having a plurality of single-grain cells, a ratchet-wheel driven by the travel of the planter, a pawl adapted to engage the ratchet-wheel and transmit motion therefrom to the seed-plate, and a plurality of shiftable throw-out cams protrudable into the path of travel of the pawl at variable points in such path.

3. In a planter, the combination of a seed-plate having a plurality of single-grain cells, a shaft geared to the seed-plate, a ratchet-wheel journaled loosely on the shaft, a pawl attached to the shaft and adapted to engage the ratchet-wheel, and a plurality of shiftable throw-out cams protrudable into the path of rotation of the pawl at different and variable points in such path.

4. In a planter, the combination of a seed-plate having a plurality of cells, a shaft geared to the seed-plate, a wheel journaled loosely on the shaft and driven by travel of the planter, ratchet-teeth extending laterally from a face of the wheel, a pawl attached to the shaft and adapted to engage the ratchet-wheel, a ring encircling the ratchet-wheel and shiftable lengthwise of the shaft, and a plurality of throw-out cams attached to the ring in position to be protruded into the path of travel of the pawl.

5. In a planter, the combination of a seed-plate having a plurality of cells, a shaft geared to the seed-plate, a wheel journaled loosely on the shaft and driven by the travel of the planter, ratchet-teeth extending laterally from a face of the wheel, a pawl connected pivotally with the shaft to swing into and out of engagement with the ratchet-teeth, a hub movable lengthwise of the shaft opposite the toothed face of the wheel, a ring on the disk encircling the ratchet-wheel, a spring on the pawl to engage the disk and a plurality of cams attached to the ring in position to be protruded into the path of travel of the pawl.

6. In a planter, the combination with the seed-plates thereof, of a ratchet-wheel, a pawl adapted to engage the ratchet-wheel, a ring encircling the ratchet-wheel, means for moving the ring axially of the ratchet-wheel and a plurality of throw-out cams on the ring.

7. In a planter, the combination with the seed-plates thereof, of a ratchet-wheel, a pawl adapted to engage the ratchet-wheel, a disk movable toward and from the ratchet-wheel, an extension of the pawl adapted to be moved by the disk to force the pawl into engagement, a ring on the disk encircling the ratchet-wheel and a cam on the ring to force the pawl out of engagement with the ratchet-wheel.

8. In a planter, the combination with the seed-plates thereof, of a ratchet-wheel the teeth whereof project laterally, a pawl adapted to engage the ratchet-wheel, a spring extension of the pawl, a disk movable toward and from the toothed face of the ratchet-wheel and against the spring extension of the pawl, a ring on the disk encircling the ratchet-wheel and a cam on the ring protrudable into the path of travel of the pawl.

9. In a planter, the combination with the seed-plates thereof, of a clutch comprising as essential elements, a ratchet-wheel having laterally-projecting teeth, a pawl swingable toward and from the ratchet-teeth and a throw-out ring encircling the ratchet-wheel and movable axially thereof.

10. In a planter, the combination with the seed-plates thereof, of a shaft, a ratchet-wheel rotatable loosely on the shaft and having laterally-projecting teeth, a pawl pivotally connected with the shaft and adapted to engage the ratchet-wheel, and a throw-out ring having an oblique movement axial of the shaft and circumferential of the ratchet-wheel.

In testimony whereof I sign my name in the presence of two subscribing witnesses.

LEVI P. GRAHAM.

Witnesses:
 INA C. GRAHAM,
 NORA GRAHAM.